US012447745B2

(12) United States Patent
Sambhy et al.

(10) Patent No.: US 12,447,745 B2
(45) Date of Patent: Oct. 21, 2025

(54) METHOD FOR PRESERVING INK VISCOSITY IN INKJETS IN AN INKJET PRINTER DURING PRINTING

(71) Applicant: Xerox Corporation, Norwalk, CT (US)

(72) Inventors: Varun Sambhy, Pittsford, NY (US); Jason M. LeFevre, Penfield, NY (US); Seemit Praharaj, Webster, NY (US); Chu-Heng Liu, Penfield, NY (US); Douglas K. Herrmann, Webster, NY (US); Linn C. Hoover, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 259 days.

(21) Appl. No.: 18/317,649

(22) Filed: May 15, 2023

(65) Prior Publication Data

US 2023/0286275 A1 Sep. 14, 2023

Related U.S. Application Data

(62) Division of application No. 17/648,609, filed on Jan. 21, 2022, now Pat. No. 11,712,897.

(51) Int. Cl.
*B41J 2/165* (2006.01)
*B41J 2/14* (2006.01)
*B41J 29/377* (2006.01)

(52) U.S. Cl.
CPC ........... *B41J 2/165* (2013.01); *B41J 2/16579* (2013.01); *B41J 2/14153* (2013.01); *B41J 2/16502* (2024.05); *B41J 29/377* (2013.01); *B41J 2202/02* (2013.01)

(58) Field of Classification Search
CPC .... B41J 2/165; B41J 2/16579; B41J 2/14153; B41J 2/16502; B41J 29/377; B41J 2202/02
See application file for complete search history.

(56) References Cited

U.S. PATENT DOCUMENTS

| | | | |
|---|---|---|---|
| 7,571,996 B2 | 8/2009 | Domoto et al. | |
| 9,527,286 B2 * | 12/2016 | Sakata | B41J 2/165 |
| 9,840,101 B2 * | 12/2017 | Sekimoto | B41J 29/377 |
| 2014/0168313 A1 | 6/2014 | Ramesh et al. | |
| 2021/0187948 A1 | 6/2021 | Praharaj et al. | |
| 2021/0187953 A1 | 6/2021 | Liu et al. | |

* cited by examiner

*Primary Examiner* — Geoffrey S Mruk
(74) *Attorney, Agent, or Firm* — Maginot Moore & Beck LLP

(57) ABSTRACT

A method of operating an inkjet printer operates solvent vapor generators that direct two flows of solvent vapor towards media on each side of each printhead in the process direction. The solvent vapor attenuates the evaporation of ink solvent from ink drops on the nozzle plates or from the ink in the nozzles of the printheads. Thus, the ink on the nozzle plates and in the nozzles does not dry out and the operational status of the inkjets is preserved.

20 Claims, 5 Drawing Sheets

METHOD FOR PRESERVING INK VISCOSITY IN INKJETS IN AN INKJET PRINTER DURING PRINTING

PRIORITY CLAIM

This application is a divisional application of and claims priority to U.S. patent application Ser. No. 17/648,609, which is entitled "System And Method For Preserving Viscosity In Inkjets In An Inkjet Printer During Printing," and which was filed on Jan. 21, 2022, and which issued as U.S. Pat. No. 11,712,897 on Aug. 1, 2023.

TECHNICAL FIELD

This disclosure relates generally to devices that produce ink images on media, and more particularly, to the preservation of ink viscosity in inkjets in such devices during printing.

BACKGROUND

Inkjet imaging devices, also known as inkjet printers, eject liquid ink from printheads to form images on an image receiving surface. The printheads include a plurality of inkjets that are arranged in an array. Each inkjet has a thermal or piezoelectric actuator that is coupled to a printhead controller. The printhead controller generates firing signals that correspond to digital data content corresponding to images. The actuators in the printheads respond to the firing signals by expanding into an ink chamber to eject ink drops onto an image receiving surface and form an ink image that corresponds to the digital image content used to generate the firing signals. The image receiving surface is usually a continuous web of media material or a series of media sheets.

Inkjet printers used for producing color images typically include multiple printhead assemblies. Each printhead assembly includes one or more printheads that typically eject a single color of ink. In a typical inkjet color printer, four printhead assemblies are positioned in a process direction with each printhead assembly ejecting a different color of ink. The four ink colors most frequently used are cyan, magenta, yellow, and black. The common nomenclature for such printers is CMYK color printers. Some CMYK printers have two printhead assemblies that print each color of ink. The printhead assemblies that print the same color of ink are offset from each other by one-half of the distance between adjacent inkjets in the cross-process direction to double the number of pixels per inch density of a line of the color of ink ejected by the printheads in the two assemblies. As used in this document, the term "process direction" means the direction of movement of the image receiving surface as it passes the printheads in the printer and the term "cross-process direction" means a direction that is perpendicular to the process direction in the plane of the image receiving surface.

Image quality in color inkjet printers depends upon at least three parameters: color gamut, graininess, and ink drop satellites. Color gamut can be addressed by using inks that dry faster. The faster drying inks allow more ink to be deposited in the image. The dryers also evaporate the ink more quickly so more ink volume can be dispensed on the media without the ink offsetting to rollers moving the media through the printer.

Graininess, and more specifically overlay graininess, can also be addressed by faster drying inks because the ink drops adhere to the media more quickly so they are immobilized faster. The primary cause of overlay graininess is shear force acting on the ink drops, which increases wet-drop-on-wet-drop interaction that intermixes the ink drops with one another. Thus, decreased mobilization reduces the ink drop interaction and, consequently, overlay graininess.

While faster drying inks improve color gamut and reduce overlay graininess, they also lead to faster ink drying on the nozzle plate and in the nozzles, especially if the inkjets are not operated frequently enough to provide fresh ink to the nozzles. Dry ink on the nozzle plate and in the nozzles leads to inoperative inkjets. As used in this document, the term "inoperative inkjet" means inkjets that do not eject ink drops at all or inkjets that eject ink drops in a direction away from the normal between an inkjet nozzle and the ink receiving surface. This problem occurs with fast drying inks more frequently in low ink coverage areas during long run prints. Low ink coverage areas occur where some inkjets are not used for a relatively long period of time so the ink in these nozzles are more prone to dry in the nozzles. Users of color inkjet printers do not accept high rates of inoperative inkjets resulting from low ink coverage areas in long print runs. Preserving the viscosity of quick drying inks in inkjet nozzles, particularly in inkjet nozzles positioned in low ink coverage areas, would be beneficial.

SUMMARY

A color inkjet printer is configured to attenuate the drying of inks, especially fast drying inks, in the nozzles of inkjets in the printheads of the printer. The color inkjet printer includes at least one printhead configured to eject drops of ink, a conveyor configured to move media past the at least one printhead to receive ink drops ejected from the at least one printhead, and a pair of solvent vapor generators for each printhead in the at least one printhead, the solvent vapor generators in the pair of solvent vapor generators for each printhead are positioned on opposite sides of each printhead in a process direction, and each solvent vapor generator in each pair of solvent vapor generators are configured to direct a flow of solvent vapor with a positive pressure toward the conveyor.

A method of operating a color inkjet printer attenuates the drying of inks, especially fast drying inks, in the nozzles of inkjets in the printheads of the printer. The method includes moving media past at least one printhead to receive ink drops ejected from the at least one printhead, and directing a first stream and a second stream of solvent vapor with a positive pressure toward the media passing the at least one printhead, the first stream and the second stream being on opposite sides in the process direction of the at least one printhead.

BRIEF DESCRIPTION OF THE DRAWINGS

The foregoing aspects and other features of a color inkjet printer and color inkjet printer operational method that attenuates the drying of inks, especially fast drying inks, in the nozzles of inkjets in the printheads of the printer are explained in the following description, taken in connection with the accompanying drawings.

DETAILED DESCRIPTION

Figure 1:
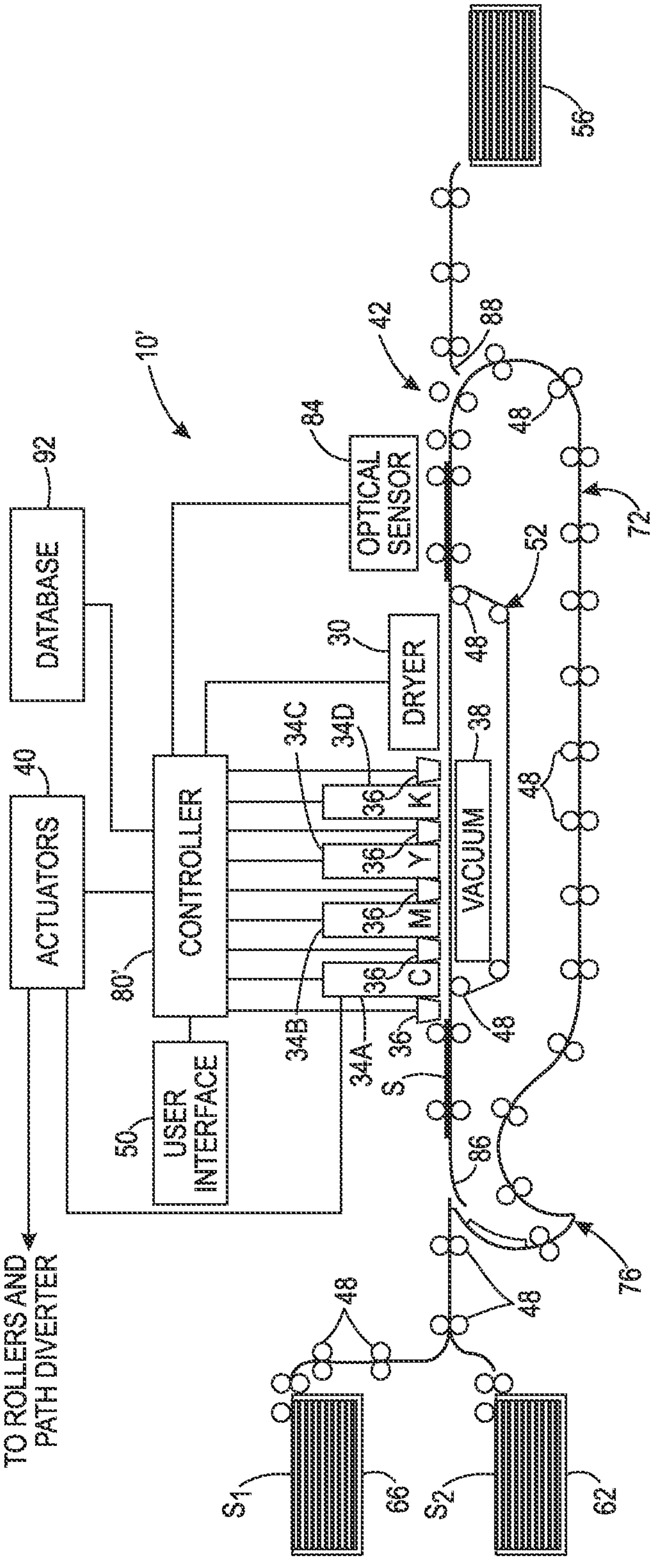
FIG. 1 is a schematic drawing of a color inkjet printer that reduces the likelihood of ink drying in the inkjets of the printheads.

For a general understanding of the environment for the printer and the printer operational method disclosed herein as well as the details for the printer and the printer operational method, reference is made to the drawings. In the drawings, like reference numerals have been used throughout to designate like elements. As used herein, the word "printer" encompasses any apparatus that ejects ink drops onto different types of media to form ink images.

The printer and method described below uses a positive flow of solvent laden air on both sides of a printhead in the process direction to provide solvent vapor to the print zone to prevent or slow the drying of ink on the printhead nozzle plate or in the inkjet nozzles. The solvent vapor has been shown to improve the reliability of the printhead inkjets by reducing the number of inoperative inkjets that occur in the printheads used to print low ink coverage areas even when fast drying inks are used in the printheads.

Figure 4:
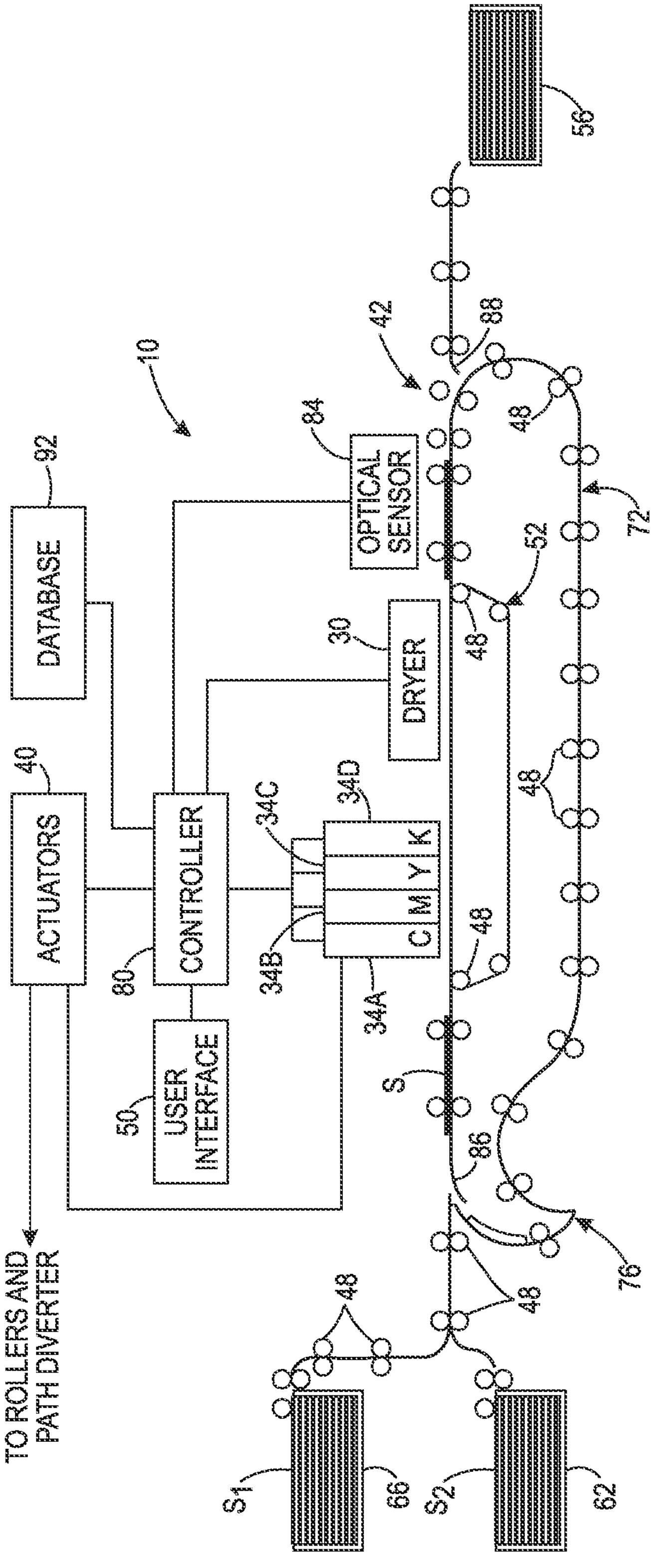
FIG. 4 PRIOR ART
FIG. 4 is a schematic drawing of a prior art color inkjet printer in which image quality is adversely impacted by the use of faster drying inks.

FIG. 4 depicts a prior art high-speed color inkjet printer 10 that does not reduce the likelihood of fast drying inks losing their viscosity in inkjets used to print low ink coverage areas during long print runs. As illustrated, the printer 10 is a printer that directly forms an ink image on a surface of a media sheet stripped from one of the supplies of media sheets S/or Sz and the sheets S are moved through the printer 10 by the controller 80 operating one or more of the actuators 40 that are operatively connected to rollers or to at least one driving roller of conveyor 52 that comprise a portion of the media transport 42 that passes through the print zone PZ (shown in FIG. 5) of the printer. In one embodiment, each printhead module has only one printhead that has a width that corresponds to a width of the widest media in the cross-process direction that can be printed by the printer. In other embodiments, the printhead modules have a plurality of printheads with each printhead having a width that is less than a width of the widest media in the cross-process direction that the printer can print. In these modules, the printheads are arranged in an array of staggered printheads that enables media wider than a single printhead to be printed. Additionally, the printheads within a module or between modules can also be interlaced so the density of the drops ejected by the printheads in the cross-process direction can be greater than the smallest spacing between the inkjets in a printhead in the cross-process direction. Although printer 10 is depicted with only two supplies of media sheets, the printer can be configured with three or more sheet supplies, each containing a different type or size of media.

Figure 5:
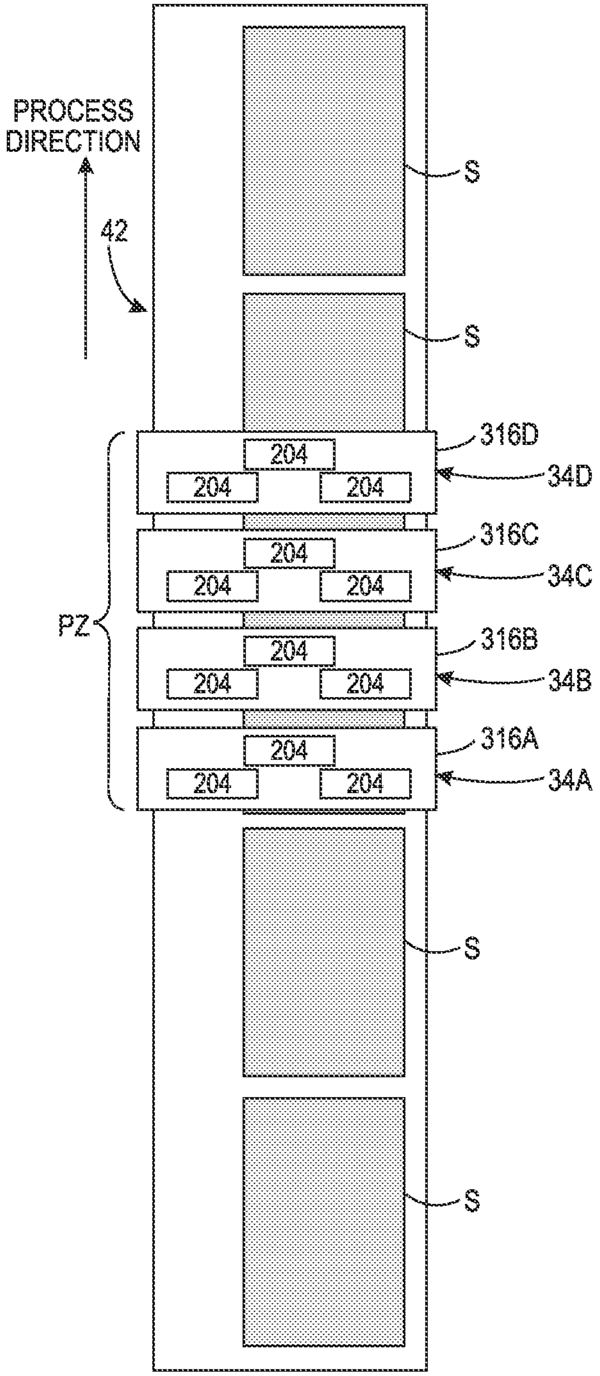
FIG. 5 PRIOR ART
FIG. 5 depicts the print zone in the printer of FIG. 4.

The print zone PZ in the prior art printer 10 of FIG. 4 is shown in FIG. 5. The print zone PZ has a length in the process direction commensurate with the distance from the first inkjets that a sheet passes in the process direction to the last inkjets that a sheet passes in the process direction and it has a width that is the maximum distance between the most outboard inkjets on opposite sides of the print zone that are directly across from one another in the cross-process direction. Each printhead module 34A, 34B, 34C, and 34D shown in FIG. 5 has three printheads 204 mounted to one of the printhead carrier plates 316A, 316B, 316C, and 316D, respectively.

As shown in FIG. 4, the printed image passes under an image dryer 30 after the ink image is printed on a sheet S. The image dryer 30 can include an infrared heater, a heated air blower, air returns, or combinations of these components to heat the ink image and at least partially fix an image to the web. An infrared heater applies infrared heat to the printed image on the surface of the web to evaporate water or solvent in the ink. The heated air blower directs heated air using a fan or other pressurized source of air over the ink to supplement the evaporation of the water or solvent from the ink. The air is then collected and evacuated by air returns to reduce the interference of the dryer air flow with other components in the printer.

Figure 3:
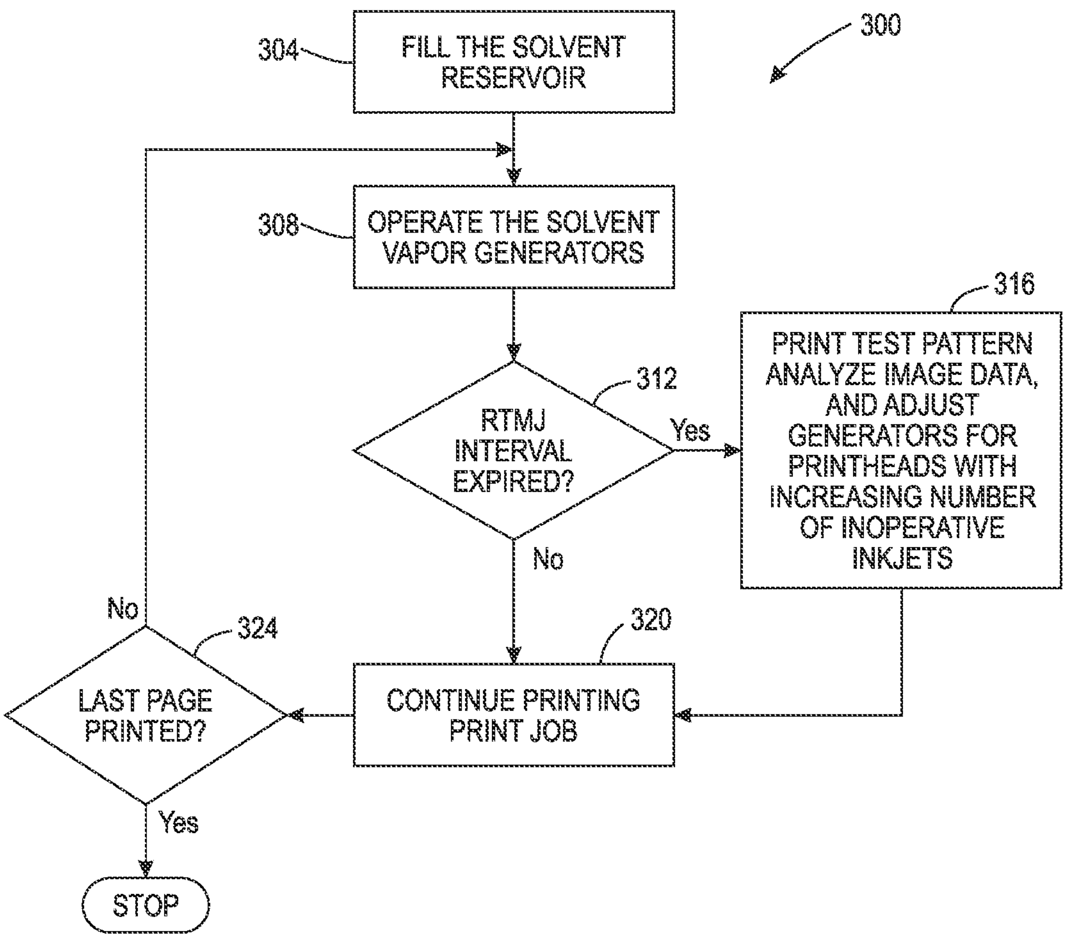
FIG. 3 is a flow diagram of a process for operating the printer of FIG. 1 so the likelihood of ink drying in the inkjets of the printheads in the printer is reduced.

A duplex path 72 is provided to receive a sheet from the transport system 42 after a substrate has been printed and move it by the rotation of rollers in an opposite direction to the direction of movement past the printheads. At position 76 in the duplex path 72, the substrate can be turned over so it can merge into the job stream being carried by the media transport system 42. The controller 80 is configured to flip the sheet selectively. That is, the controller 80 can operate actuators to turn the sheet over so the reverse side of the sheet can be printed or it can operate actuators so the sheet is returned to the transport path without turning over the sheet so the printed side of the sheet can be printed again. Movement of pivoting member 88 provides access to the duplex path 72. Rotation of pivoting member 88 is controlled by controller 80 selectively operating an actuator 40 operatively connected to the pivoting member 88. When pivoting member 88 is rotated counterclockwise as shown in FIG. 3, a substrate from media transport 42 is diverted to the duplex path 72. Rotating the pivoting member 88 in the clockwise direction from the diverting position closes access to the duplex path 72 so substrates on the media transport move to the receptacle 56. Another pivoting member 86 is positioned between position 76 in the duplex path 72 and the media transport 42. When controller 80 operates an actuator to rotate pivoting member 86 in the counterclockwise direction, a substrate from the duplex path 72 merges into the job stream on media transport 42. Rotating the pivoting member 86 in the clockwise direction closes the duplex path access to the media transport 42.

As further shown in FIG. 4, the printed media sheets S not diverted to the duplex path 72 are carried by the media transport to the sheet receptacle 56 in which they are be collected. Before the printed sheets reach the receptacle 56, they pass by an optical sensor 84. The optical sensor 84 generates image data of the printed sheets and this image data is analyzed by the controller 80. The controller 80 is configured to detect streakiness in the printed images on the media sheets of a print job. Additionally, sheets that are printed with test pattern images are inserted at intervals during the print job. These test pattern images are analyzed by the controller 80 to determine which inkjets, if any, that were operated to eject ink into the test pattern did in fact do so, and if an inkjet did eject an ink drop whether the drop landed at its intended position with an appropriate mass. Any inkjet not ejecting an ink drop it was supposed to eject or ejecting a drop not having the right mass or landing at an errant position is called an inoperative inkjet in this document. The controller can store data identifying the inoperative inkjets in database 92 operatively connected to the controller. These sheets printed with the test patterns are sometimes called run-time missing inkjet (RTMJ) sheets and these sheets are discarded from the output of the print job. A user can operate the user interface 50 to obtain reports displayed on the interface that identify the number of inoperative inkjets and the printheads in which the inoperative inkjets are located. The optical sensor 84 can be a digital camera, an array of LEDs and photodetectors, or other devices configured to generate image data of a passing surface. As already noted, the media transport also includes a duplex path that can turn a sheet over and return it to the transport prior to the printhead modules so the opposite side of the sheet can be printed. While FIG. 4 shows the printed sheets as being collected in the sheet receptacle, they can be directed to other processing stations (not shown) that perform tasks such as folding, collating, binding, and stapling of the media sheets.

Operation and control of the various subsystems, components and functions of the machine or printer 10 are performed with the aid of a controller or electronic subsystem (ESS) 80. The ESS or controller 80 is operatively connected to the components of the printhead modules 34A-34D (and thus the printheads), the actuators 40, and the dryer 30. The ESS or controller 80, for example, is a self-contained computer having a central processor unit (CPU) with electronic data storage, and a display or user interface (UI) 50. The ESS or controller 80, for example, includes a sensor input and control circuit as well as a pixel placement and control circuit. In addition, the CPU reads, captures, prepares, and manages the image data flow between image input sources, such as a scanning system or an online or a work station connection (not shown), and the printhead modules 34A-34D. As such, the ESS or controller 80 is the main multi-tasking processor for operating and controlling all of the other machine subsystems and functions, including the printing process.

The controller 80 can be implemented with general or specialized programmable processors that execute programmed instructions. The instructions and data required to perform the programmed functions can be stored in memory associated with the processors or controllers. The processors, their memories, and interface circuitry configure the controllers to perform the operations described below. These components can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in very large scale integrated (VLSI) circuits. Also, the circuits described herein can be implemented with a combination of processors, ASICs, discrete components, or VLSI circuits.

In operation, image content data for an image to be produced are sent to the controller 80 from either a scanning system or an online or work station connection for processing and generation of the printhead control signals output to the printhead modules 34A-34D. Along with the image content data, the controller receives print job parameters that identify the media weight, media dimensions, print speed, media type, ink area coverage to be produced on each side of each sheet, location of the image to be produced on each side of each sheet, media color, media fiber orientation for fibrous media, print zone temperature and humidity, media moisture content, and media manufacturer. As used in this document, the term "print job parameters" means non-image content data for a print job and the term "image content data" means digital data that identifies an ink image to be printed on a media sheet.

Figure 2:
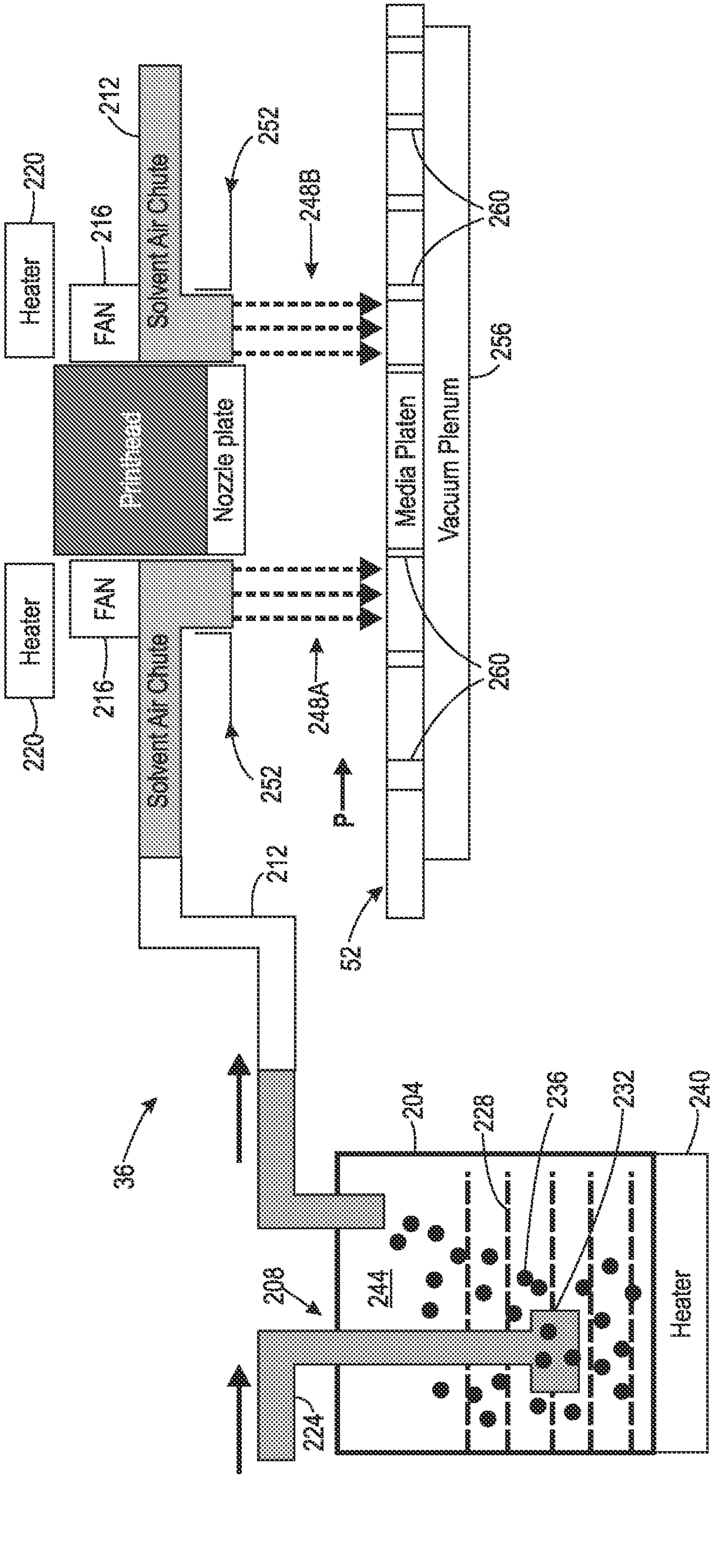
FIG. 2 is a side view of one printhead in one of the printhead modules of the printer shown in FIG. 1 that depicts the bubbler that generates solvent laden air and the discharge of the solvent laden air on either side of the printhead in the process direction.

Using like reference numbers to identify like components, FIG. 1 depicts a high-speed color inkjet printer 10' in which solvent vapor generators 36 direct solvent laden air on both sides of each printhead to maintain the viscosity of ink on nozzle plates and in the nozzles of inkjets. A single generator 36 is depicted between adjacent printheads in the print zone in order to simplify the figure; however, two generators can be provided in the process direction with one generator producing solvent vapor for the preceding printhead in the process direction and the other generator producing solvent vapor for the next printhead in the process direction. This configuration is shown in FIG. 2, with each printhead having two generators 36 between the printheads 34A and 34B, for example, so printhead 34A has a generator 36 after the printhead 34A in the process direction and printhead 34B has a generator 36 before the printhead 34B in the process direction. As described in more detail below, the generators 36 are fluidly connected to bubblers to receive solvent laden air and fans push this solvent laden air down to the media transport on both sides of each printhead in the printhead modules 34A. 34B, 34C, and 34D in the process direction. For a printer having a single printhead, two solvent vapor generators are positioned on each side of the printhead in the process direction to provide the solvent laden air for the nozzles of the printhead.

A solvent vapor generator 36 is shown in more detail in FIG. 2. In FIG. 2, the generator 36 includes a solvent reservoir 204, a bubbler 208, a chute 212, a fan 216, and in some embodiments, a heater 220. The solvent reservoir 204 is a vessel having an internal volume configured to hold an ink solvent or a mixture of ink solvents. The ink solvents can include, but are not limited to, water, hexanediol, butanediol, and propanediol, which are ink solvents commonly used in aqueous inkjet printers. In embodiments in which inks having different solvents are used, the fluid in the reservoir is a mixture of the various solvents in some appropriate ratio. In one embodiment, the ratio of the different solvents is 1:1:1. An inlet 224 of the bubbler 208 supplies air into the solvent reservoir 204 below the surface of the solvent 228. As the air is emitted from the bubbler outlet 232, it produces bubbles 236 that form a solvent vapor in the head space 244 of the reservoir 204. As the fan 216 blows air into the chute 212, the exiting solvent laden air flow 248A pulls more solvent laden air from the head space 244. This solvent laden air 248A is directed to the side of the printhead first encountered in the process direction P. Heater 220 is provided in some embodiments to heat the air that is pushed by the fan 216. The warmer air is able to hold more solvent vapor. Also, in some embodiments, a heater 240 heats the solvent reservoir 204 to increase the solvent vapor pressure in the head space 244. Manifold walls 252 are positioned on opposite sides of the printheads in the process direction. The outlet end of the chute 212 is positioned in the gap between manifold walls 252 and the sides of the printhead in the process direction P. These walls have a length in the cross-process direction that correspond to the length of the printhead sides in the cross-process direction and help prevent the dissipation of the solvent laden air before it reaches the media sheets. In one embodiment, the gap between the manifold walls and the printhead sides is about 0.5 mm.

A solvent vapor generator 36 is also provided on the side of the printhead last encountered in the process direction P. Although only the chute 212, the fan 216, and optional heater 220 are shown for this generator 36 in FIG. 2, it also includes a bubbler 208 configured as described above. This solvent vapor generator produces the solvent laden air flow 248B. In other embodiments, however, the chute 212 fluidly connects the head space 244 of the reservoir 204 to the fan 216 on the opposite side of the printhead so only a single solvent reservoir is required for each printhead. In other embodiments, a single solvent reservoir supplies solvent vapor to both sides of all of the printheads in a single printhead assembly. As used in this document, the term "solvent vapor generator" means any combination of components that produce solvent vapor and direct the vapor to at least one side of a printhead aligned in the cross-process direction. As used in this document, the term "bubbler" means any device that directs air flow beneath a surface of a volume of liquid to produce bubbles in the liquid.

Opposite the printheads in the print zone and positioned within the conveyor 52 is a vacuum plenum 256 that is operatively connected to a vacuum (not shown). The negative air pressure within the plenum 256 pulls air from the opposite of the conveyor 52 through the holes 260. This force helps hold media to the conveyor 52 as the media is being printed. A relatively short distance separates the leading edges of the media sheets from the trailing edges of the media sheets in the process direction. In these gaps between the media sheets, sometimes called an inter-document zone, the vacuum pulls the air between the sheets in this gap. The pull of this vacuum and the positive air flow from the chute 212 helps direct some of the solvent laden air on the back side of a printhead in a direction opposite to the process direction P. This interaction helps ensure that the inkjets nearer the side of the printhead last encountered in the process direction P have an adequate supply of solvent laden air.

Fans 216 in some embodiments are operatively connected to the controller 80' so the speed of the fans can be regulated. As noted previously, some printers from time to time print RTMJ sheets and the optical sensor 84 generates image data of these sheets printed with a test pattern. The controller 80' analyzes the printed test patterns on these sheets to identify inoperative inkjets. If the number of inoperative inkjets for a printhead is increasing, then the controller 80' adjusts the speed for one or both of the fans in the generators 36 on either side of the printhead in the process direction P to increase the amount of solvent laden air in the portion of the print zone opposite that printhead. Additionally, the heaters 220 for the generators 36 can also be operatively connected to the controller 80' for independent control of these heaters. In addition to adjusting the speed of the fans 216, the heaters 220 can be adjusted by the controller 80' to increase the amount of solvent laden air in the portion of the print zone opposite a printhead.

The solvent laden air produced by the generators 36 permeates the portions of the print zone opposite the printheads. This solvent vapor prevents or attenuates the evaporation of solvent from the ink on the nozzle plates of the printheads or the ink in nozzles of the printheads. Thus, the ink does not dry and produce inoperative inkjets, especially when the inks are fast drying or the inkjets are used to print low coverage areas in long print runs.

FIG. 3 depicts a flow diagram for a process 300 that operates the solvent vapor generators 36 in the printer 10' to maintain a solvent vapor environment in the print zone of the printer. In the discussion below, a reference to the process 300 performing a function or action refers to the operation of a controller, such as controller 80', to execute stored program instructions to perform the function or action in association with other components in the printer. The process 300 is described as being performed with the printer 10' of FIG. 1 for illustrative purposes.

The process 300 of operating the printer 10' begins with the filling of the reservoir with a solvent or a solvent mixture and operation of the bubbler to produce solvent laden air in the head space of the solvent reservoir (block 304). The fans of the solvent vapor generators are operated to urge solvent laden air into the portions of the print zone opposite the printheads (block 308). Upon detection of the expiration of a predetermined period of time (block 312), the process prints a RTMJ sheet (block 316). The printed test pattern is analyzed and the operation of any solvent vapor generator corresponding to a printhead having an increase in the number of inoperative inkjets is adjusted (block 320). The process continues until the last sheet is printed (block 324). At that point, the process is finished.

It will be appreciated that variants of the above-disclosed and other features, and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed:

1. A method of operating an inkjet printer comprising:

moving media past at least one printhead to receive ink drops ejected from the at least one printhead;

generating solvent vapor within a space above a volume of liquid solvent within a reservoir; and operating at least one positive pressure source to direct a first stream and a second stream of solvent vapor toward the media passing the at least one printhead, the first stream and the second stream being on opposite sides of the at least one printhead in a process direction.

2. The method of claim 1 further comprising:

operating a first source of positive air pressure to direct the first stream of generated solvent vapor from the reservoir toward the media passing the at least one printhead.

3. The method of claim 2 further comprising:

directing air into the volume of liquid solvent in the first reservoir with a second source of positive air pressure; and fluidly connecting the space above the volume of liquid solvent in the first reservoir to the first source of positive air pressure.

4. The method of claim 3 further comprising:

heating with a first heater air directed by the first source of positive air pressure toward the media passing the at least one printhead.

5. The method of claim 4 further comprising:

heating with a second heater the volume of solvent in the first reservoir.

6. The method of claim 5, the directing of the first stream and the second stream further comprising:

operating a first fan and a second fan to direct the first stream of solvent vapor and the second stream of solvent vapor toward the media passing the at least one printhead.

7. The inkjet printer of claim 6, the movement of the media further comprising:

rotating an endless belt having a plurality of holes about rollers to move the media past the at least one printhead; and pulling air through the holes in the endless belt with a negative source of air pressure positioned within the endless belt.

8. The method of claim 7 further comprising:

operating the at least one printhead to form a test pattern with ejected drops of ink on the media passing the at least one printhead;

generating with an optical sensor image data of the test pattern on the media after the media has passed the at least one printhead;

analyzing the image data generated by the optical sensor of the test pattern formed on the media to identify inoperative inkjets in the at least one printhead; and adjusting a property of at least one of the first stream and the second stream of solvent vapor being directed toward the media passing the at least one printhead using the identification of the inoperative inkjets in the at least one printhead.

9. The method of claim 8, the adjustment of the property of the at least one of the first stream and the second stream of solvent vapor further comprising:

adjusting a speed of the at least one of the first stream and the second stream of solvent vapor directed toward the endless belt.

10. The method of claim 8, the adjustment of the property of the at least one of the first stream and the second stream of solvent vapor further comprising:

adjusting a temperature of the at least one of the first stream and the second stream of solvent vapor directed toward the endless belt.

11. A method of operating an inkjet printer comprising:

generating solvent vapor above a volume of solvent held within a reservoir;

operating a first positive pressure source positioned on a first side of a printhead to direct a first flow of the generated solvent vapor toward a conveyor moving media past the printhead; and operating a second positive pressure source positioned on a second side of the printhead to direct a second flow of the generated solvent vapor toward the conveyor moving media past the printhead, the first and the second flows of generated solvent vapor being on opposite sides of the printhead in a process direction.

12. The method of claim 11, the generation of the solvent vapor further comprising:

supplying a flow of air through a conduit to an outlet of the conduit positioned within the volume of solvent in the reservoir.

13. The method of claim 11 further comprising:

heating the generated solvent vapor before the first positive pressure source directs the first flow of generated solvent vapor toward the conveyor.

14. The method of claim 13 further comprising:

heating the volume of solvent in the reservoir.

15. The method of claim 14, the directing of the first flow of the generated solvent vapor further comprising:

operating a fan to generate an air stream directed toward the conveyor.

16. The method of claim 15 further comprising:

pulling the first flow of the generated solvent vapor and the second flow of the generated solvent vapor through a plurality of holes extending through the conveyor into a plenum on a side of the conveyor opposite to the printhead.

17. The method of claim 16 further comprising:

operating the printhead to form a test pattern with ejected drops of ink on the media passing the printhead;

generating image data of the test pattern formed on the media after the media has passed the at least one printhead;

analyzing the generated image data of the test pattern formed on the media to identify inoperative inkjets in the printhead; and adjusting operation of at least one positive pressure source using the identification of the inoperative inkjets in the printhead.

18. The method of claim 17 further comprising:

adjusting a speed of the first flow of the generated solvent vapor toward the conveyor.

19. The method of claim 18 further comprising:

adjusting a temperature of the first flow of the generated solvent vapor toward the conveyor.

20. The method of claim 11 further comprising:

generating the solvent vapor for the first stream within a space above a volume of liquid solvent within a first reservoir;

operating a first source of positive air pressure to direct the first stream of generated solvent vapor from the first reservoir toward the media passing the at least one printhead;

generating the solvent vapor for the second stream within a space above a volume of liquid solvent within a second reservoir;

operating a second source of positive air pressure to direct the second stream of generated solvent vapor from the second reservoir toward the media passing the at least one printhead.

* * * * *